United States Patent [19]

van Turnhout et al.

[11] E Re. 31,285

[45] Reissued Jun. 21, 1983

[54] METHOD FOR MANUFACTURING A FILTER OF ELECTRICALLY CHARGED ELECTRET FIBER MATERIAL AND ELECTRET FILTERS OBTAINED ACCORDING TO SAID METHOD

[75] Inventors: Jan van Turnhout, Pijnacker; Johannes C. Rieke, Delft, both of Netherlands

[73] Assignee: Minnesota Mining and Manufacturing Company, St. Paul, Minn.

[21] Appl. No.: 328,027

[22] Filed: Dec. 7, 1981

Related U.S. Patent Documents

Reissue of:

[64] Patent No.: 4,178,157
Issued: Dec. 11, 1979
Appl. No.: 862,768
Filed: Dec. 21, 1977

[30] Foreign Application Priority Data

Dec. 23, 1976 [NL] Netherlands ..... 7614376

[51] Int. Cl.[3] ..... B03C 3/00; B29C 24/00

[52] U.S. Cl. ..... 55/155; 55/528; 55/DIG. 39; 264/22; 264/230; 264/342 R; 264/DIG. 48; 428/369

[58] Field of Search ..... 264/DIG. 47, DIG. 48, 264/168, 22, 230, 342 R, 342 RE, 345, 282; 55/527, 528, DIG. 5, DIG. 39, 155; 210/508; 428/227, 228, 280, 369, 370, 36; 131/333; 128/205.29; 361/226, 233

[56] References Cited

U.S. PATENT DOCUMENTS

| | | | |
|---|---|---|---|
| Re. 30,782 | 10/1981 | Turnhout | 264/DIG. 47 |
| 3,378,997 | 9/1966 | Matsui et al. | 57/34 |
| 3,550,517 | 3/1970 | Dekker et al. | 264/DIG. 47 |
| 3,578,739 | 5/1971 | George | 18/8 |
| 3,608,024 | 9/1971 | Yazawa | 264/DIG. 47 |
| 3,966,597 | 6/1976 | Omori et al. | 264/DIG. 47 |
| 3,998,916 | 12/1976 | Turnhout | 264/DIG. 47 |

*Primary Examiner*—Michael W. Ball
*Attorney, Agent, or Firm*—C. Alexander; D. M. Sell; R. R. Tamte

[57] ABSTRACT

A method for forming a filter of electrically charged electret fiber material, consisting of a high molecular weight, nonpolar polymeric substance, comprising drawing, charging, and fibrillating a foil of said high molecular weight substance. The fibrillated foil is wound and then crimping is effected.

10 Claims, 2 Drawing Figures

METHOD FOR MANUFACTURING A FILTER OF ELECTRICALLY CHARGED ELECTRET FIBER MATERIAL AND ELECTRET FILTERS OBTAINED ACCORDING TO SAID METHOD

Matter enclosed in heavy brackets [ ] appears in the original patent but forms no part of this reissue specification; matter printed in italics indicates the additions made by reissue.

The invention is related to a method for manufacturing a filter of electrically charged electret fiber material, consisting of a highmolecular non-polar substance, comprising the continuous supply of a foil of said substance, the drawing, charging and fibrillating of the foil and the processing of the thus fiber material into a filter.

Such a method is known. However, it appeared that in the filters obtained according to said method the coherence in the fiber mass is often insufficient in particular for that application in which the filter has to endure mechanical vibrations or is mechanically loaded in another way. Moreover, the filter effect does not satisfy completely the expectations because of the fact, that the penetration in a high loading with dust increases too rapidly.

The invention aimes to provide a method for manufacturing a filter with which such a structure of the filter is obtained, that mechanical as well as filtering characteristics of the filter satisfy high demands.

To obtain this, the method according to the invention is characterized in that by a suitable choice of the foil and/or by the type of drawing, crimpable fiber material is manufactured, this is wound in uncrimped condition to a fibrous package and that subsequently the crimping is effected.

By having the fibers crimped after being made into a package, in which they already have a certain mutual coherence, the fibers interlock and strengthen their coherence with the result that they form a firm filter which appears to stand a mechanical loading. Moreover, it appears that the pores of the filter have become more erratic concerning their shape and have become more uniform in measure and distribution; by this the catching of dust by the charged fibers is improved, as appears from a lower penetration and therefore a better functioning of the filter.

To be able to wind the fiber material in a not-crimped condition to a fiber package, the foil is during fibrillation as well as the netlike fiber fleece, obtained by this, slightly tensioned during winding, by which the spontaneous tendency to crimp of the fibers is oppressed.

After the fiber package of the desired volume is wound, it is taken from the winding means for instance by cutting it in the axial direction. The tension, with which it is wound, then falls off so the crimping of the fibers takes place.

To strengthen the crimp and also to fix the crimp and with that the coherence of the fibers according to a preferred embodiment of the method according to the invention. The filter is subjected to a heat treatment, for instance by putting it during about 15 minutes in an oven at about 70° C.

The filter may, if necessary, still further be consolidated and compacted by subjecting it to a needle treatment.

The crimpability of the fibers is according to a further feature of the invention obtained in that a foil is used in which at least two substances with different drawing- or crimping characteristics are incorporated in a non-homogeneous mixture.

According to a preferred embodiment of the method a foil is used being a laminate of said substances. The crimping characteristics of the thus obtained fibers are more uniform and reproducable, so it is avoided that the filter has weak parts or parts being too pervious. The draw- or crimp characteristics of the used substances may differ as result of the fact that the substances are of different type. However, they also can be of the same type; the difference in characteristics then are caused by a difference in molecular weight of or admixtures, or in the case of a laminate by the fact that the substance of the one layer is predrawn and that of the other layer is not drawn or not drawn in the same measure.

In another embodiment of the method according to the invention, the crimpability of the fibers is obtained or improved by the fact that the foil during or after drawing is deformed strongly for instance by moving it over a sharp edge.

The invention is also related to filters manufactured according to the above method. These filters differ with regard to known filters in that they have better mechanical characteristics, an improved homogenity and an improved filter action. They are in particular suited for those applications in which the catching of bacteria is of importance, such as ventilation systems for operating rooms and laboratories as face masks, and as a filter in suction cleaners, either as a dust bag or as a discharge filter. Moreover, they have the advantage that they are more resilient than filters of not crimped fibers, so that they can be pressed together for saving space during transport and storage.

The product obtained by the method according to the invention can besides being used as filter, also be used as a dust remover. By rubbing a piece of the filter material over a surface, e.g. the surface of a record, the surface becomes completely free of dust while the coherence of the fibers as result of their crimp avoids that loose fibers of the filter material remain on the surface.

The invention will now be described with the aid of a drawing.

Figure 1:
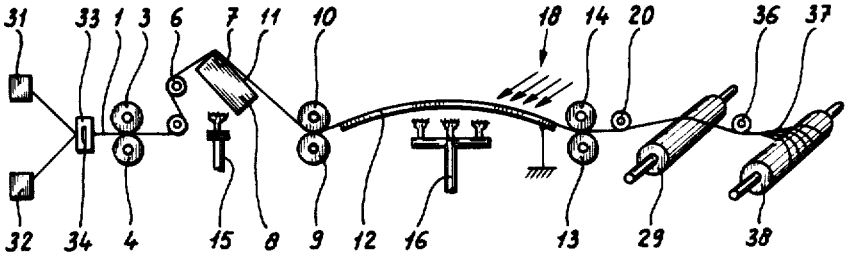
FIG. 1 shows schematically the method according to the invention.

Each of the extruders 31 and 32 supply a component of the high molecular weight, polymeric substance, each of them differing in molecular weight, to a common nozzle 33 with the strip-like extrusion mouth 34. The thus obtained foil 1, in which both components are present in a laminate-shaped non-homogeneous distribution, is after passing the rollers 3 and 4 subjected to a first drawing between the roller pair 5 and 6 and the roller pair 9 and 10 rotating at a higher speed, in which it is drawn over an edge 7 of a block 8 provided with a schematically indicated heater 15. Between the roller pair 9 and 10 and the roller pair 13 and 14 rotating at a still higher speed the foil 1 is subjected to a second drawing while it is advanced over a bent plate 12, provided with a schematically indicated heater 16. At the same time, the foil 1 is electrically charged by the spray device 18, comprising corona wires 25 being connected to a not shown high-tension source and of which the plate 12 forms the anti-pole. The splittable electret foil 1 obtained in this manner subsequently is advanced via the support roll 20 over the needle roll 29, which fibrillates the foil 1 to a fibrillated fiber band 35. Subsequently, the latter is widened by the spreading device 36 to a net-like fiber fleece 37 and wound on to the roll 38.

When in this way a fiber mat of the desired thickness is wound, it is taken from the roll 38 by cutting it in the direction of the axis of the roll or by pushing it from the roll 38 without cutting. The fibers of which the fiber mat exists now are not held anymore in straightened shape and crimp spontaneously as result of the different measure of relaxation-crimp in both components of the high-molecular substance of which they are made. The fibers mesh with each other and form a filter mat with a homogeneous and firm structure, which is further still improved by a heat treatment of about 15 minutes in an oven not shown in the drawing, of which the temperature is kept at about 70° C.

Figure 2:
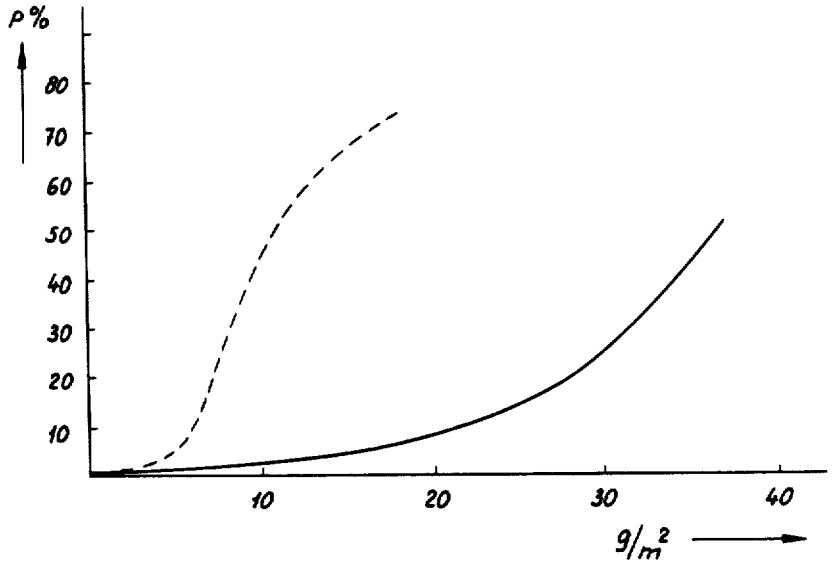
FIG. 2 shows the penetration as function of the loading with dust of a crimped filter according to the invention and of a comparable not-crimped filter.

FIG. 2 shows a diagram in which on the ordinate penetration, defined as the ratio of the dust concentration behind the filter to that before the filter is shown in percentages, and on the abscis the dust loading of the filter in g/m$^2$. The solid line shows the result for a crimped electret filter obtained according to the invention and the dashed line for a comparable not crimped electret filter.

The diagram shows, that the penetration of perviousness for the not catched dust of the electret filter of crimped fibers with increasing dust loading is subsequently lower than that of the filter of not crimped fibers, so in practice the crimped filter has a much longer life-time than the not-crimped filter.

EXAMPLE

According to the method described with the aid of FIG. 1 a laminate having a thickness of 50/μm and a width of 6 cm consisting of polypropylene with a melt flow index of 1.5 and polypropylene with a melt flow index of 8 is drawn with an initial speed of 13 m/minute over block 8, having a temperature of about 100° C., in a draw ratio of 1:6 and subsequently over the plate 12 having a temperature of about 150° C. in a draw ratio of 1:1.5. The corona wires 25 are present 5 mm above the foil and have a tension of −10 kV with regard to the plate 12. The foil is fibrillated with a needle roller with 60 rows of which the needles are positioned at a mutual distance of 0.5 mm. The obtained split fiber band is spread to a width of 90 cm and is wound in 170 layers to a fiber mat with a thickness of 3 mm. The fiber mat is taken from the roll and is placed during 15 minutes in an oven at 70° C. The obtained filter cloth appeared to have a density of 250 g/m$^2$.

In FIG. 2 the solid line shows the filter features of this cloth. The filter of not crimped fibers compared herewith, of which filter the dashed line shows the features, is obtained by in the same manner drawing, fibrillating and winding a foil with the same dimensions but comprising exclusively polypropylene with a melt flow index of 1.5 and winding it to a filter bat with also a density of 250 g/m$^2$.

During testing both filters showed practically no difference in flow resistance and the resistance increased for both filters only in neglectable measure.

We claim:

1. A method for manufacturing a filter of electrically charged electret fiber material, consisting of a high-molecular weight, non-polar polymeric substance, comprising the steps of: continuously supplying a foil of said substance, drawing, charging and fibrillating of the foil and the processing of the thus obtained filter material into a filter, selecting the foil and/or the type of drawing to manufacture spontaneously crimpable fiber material, winding said material in uncrimped condition to a fibrous package and subsequently effecting crimping to interlock the fibers of said fibrous package.

2. A method according to claim 1, further comprising the step of heat treating the filter.

3. A method according to claim 1, wherein a foil is used in which at least two substances with different drawing or crimping characteristics are incorporated in a non-homogeneous mixture.

4. A method according to claim 3, wherein a foil is used being a laminate of said at least two substances.

5. A method according to claim 1, further comprising the step of deforming the foil during or after the step of drawing.

6. A filter produced by the method according to claim 1.

*7. An electret fibrous web comprising fibers fibrillated from a film of a high-molecular-weight nonpolar substance and which contain electric charges embedded therein so as to enhance filtration properties of the web, said fibers being crimped after fibrillation and intermeshed with one another, said fibrous web being capable of being loaded with high amounts of dust while still maintaining high filtration efficiency.*

*8. An electret fibrous web of claim 7 in which said fibers comprise polypropylene.*

*9. An electret fibrous web of claim 7 in which said fibers are fibrillated from a film that comprises a laminate of at least two different high-molecular-weight nonpolar substances.*

*10. An electret fibrous web of claim 9 in which both of said different substances comprise polypropylene.*

* * * * *